April 23, 1957  C. W. LEUPOLD  2,789,593

APPARATUS FOR CUTTING SANITARY NAPKINS

Filed March 31, 1955

Inventor:
CURT WALTER LEUPOLD
By Jahn and Ornstein

United States Patent Office 2,789,593
Patented Apr. 23, 1957

---

2,789,593

APPARATUS FOR CUTTING SANITARY NAPKINS

Curt Walter Leupold, Nurnberg, Germany

Application March 31, 1955, Serial No. 498,409

Claims priority, application Germany November 9, 1954

1 Claim. (Cl. 143—38)

This invention relates generally to the manufacture of sanitary napkins, but has reference more particularly to apparatus for cutting or beveling the napkins during such manufacture.

It has heretofore been proposed or suggested to bevel off the longitudinal sides or edges of sanitary napkins, so as to render the napkins trapezoidal in cross-section. However, in the normal process of manufacture of such napkins, the lateral edges turn out perpendicular to the upper and lower surfaces of the napkins, so that these edges have to be specially cut to provide beveled edges.

The present invention has as its primary object the provision of apparatus or means for satisfactorily beveling the edges of sanitary napkins during the course of manufacture of such napkins.

Another object of the invention is to provide apparatus of the character described, which can be easily installed or inserted in a continuous production process or line for manufacturing sanitary napkins.

A further object of the invention is to provide apparatus of the character described, by means of which faultless cuts can be produced, and seizure by the napkin material avoided.

Other objects and advantages of my invention will be apparent during the course of the following description.

In the accompanying drawings forming a part of this specification and in which like numerals are employed to designate like parts throughout the same, Fig. 1 is a side elevational view of apparatus embodying the invention;

Figure 1:
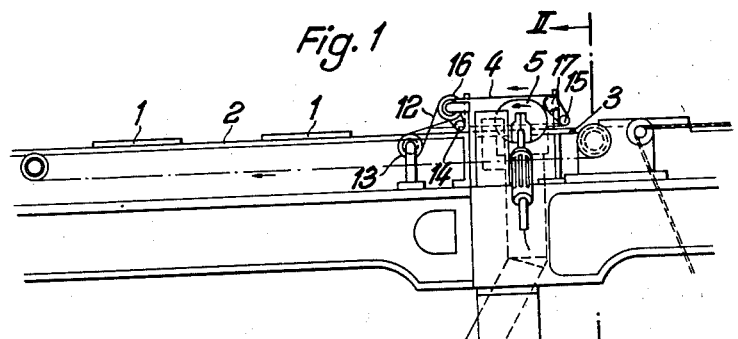
Figure 3:
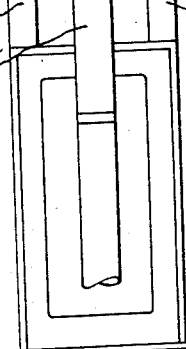
Fig. 3 is a perspective view of a sanitary napkin having beveled edges, as produced by the apparatus.
Figure 2:
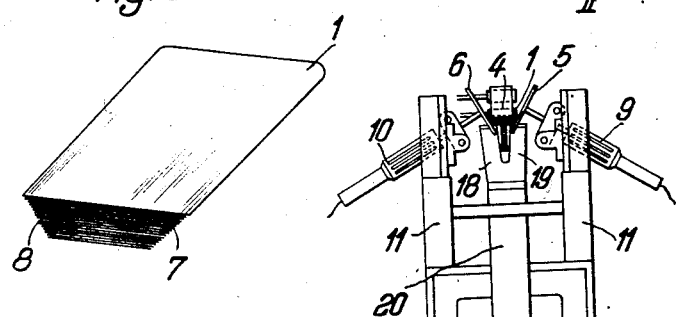
Fig. 2 is a cross-sectional view, taken on the line 2—2 of Fig. 1.

Referring more particularly to Figs. 1 to 3 of the drawings, the napkins 1 are delivered by an endless conveyor belt 2 onto a support or slide surface 3.

Above the slide surface 3, adjacent one end of the conveyor belt, an endless transporter belt 4 is provided, to which the napkins are carried by the conveyor belt 2. The transporter belt 4 is driven by a belt 12 from the shaft 13 of the conveyor belt 2. Idler rollers 14 and 15 are hingedly carried by the shafts of rollers 16 and 17 about which the belt 4 is wound, and the lower run of the belt 4 passes under the rollers 14 and 15. The napkins 1 are forced or pressed by the lower run of the belt 4 against the support or slide surface 3 and are fed by the belt 4 between two circular saw blades 5 and 6.

The saw blades 5 and 6 are set at an inclination, so as to cut off portions of the sides of the napkins 1, and provide the desired bevel edges 7 and 8 for the napkins.

The circular saw blades 5 and 6 are preferably driven by high frequency motors 9 and 10, which are fastened to the machine frame 11.

In order to produce faultless cuts, as well as to prevent seizure of the saw blades by the napkin material which is shredded by the saws, the following conditions are to be observed:

(a) The peripheral speed of the circular saws should be approximately 70 to 100 meters per second.

(b) The diameter of the circular saw blades should be 10 to 15 cm., with an R. P. M. of 12,000.

(c) The circular saw blades should be not more than 0.5 mm. in thickness.

(d) Suction conduits, such as 18 and 19, should be provided at the cutting points, these conduits uniting to form a conduit 20 through which the waste material cut by the saw blades can be drawn off.

The beveled napkins are then delivered or transported by the transporter belt 4 onto another conveyor belt which transports the napkins to other stations where subsequent steps in the manufacture of the napkins are performed.

It is apparent from the foregoing description that the apparatus can be easily inserted in a continuous production process or line for manufacturing sanitary napkins.

It is also apparent that the rate of travel of the napkins through the saws is the same as the velocity of the conveyor belt 2 or the belt onto which the beveled napkins are carried.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

In an apparatus for manufacturing sanitary napkins, the combination of means for feeding napkin webs in a horizontal plane, a slide surface or support onto which said napkin webs are fed, a conveyor belt bearing on the webs and forcing the same downwardly against said slide or support, and means for cutting off portions of the sides of said webs as they move along said slide or support, said cutting means comprising spaced circular saws, the planes of which slope downwardly toward each other and are parallel to the direction of movement of said conveyor belt, said conveyor belt carrying said webs between said saws, and forcing the webs outwardly against the saws.

References Cited in the file of this patent

UNITED STATES PATENTS

| | | |
|---|---|---|
| 689,026 | Rust | Dec. 17, 1901 |
| 823,506 | Cadorette et al. | June 19, 1906 |
| 922,840 | Bemiller | May 25, 1909 |
| 1,439,801 | Davis | Dec. 26, 1922 |
| 2,664,123 | Arvidson | Dec. 29, 1953 |
| 2,673,585 | Blum | Mar. 30, 1954 |
| 2,732,867 | May et al. | Jan. 31, 1956 |